Figures 1, 2:
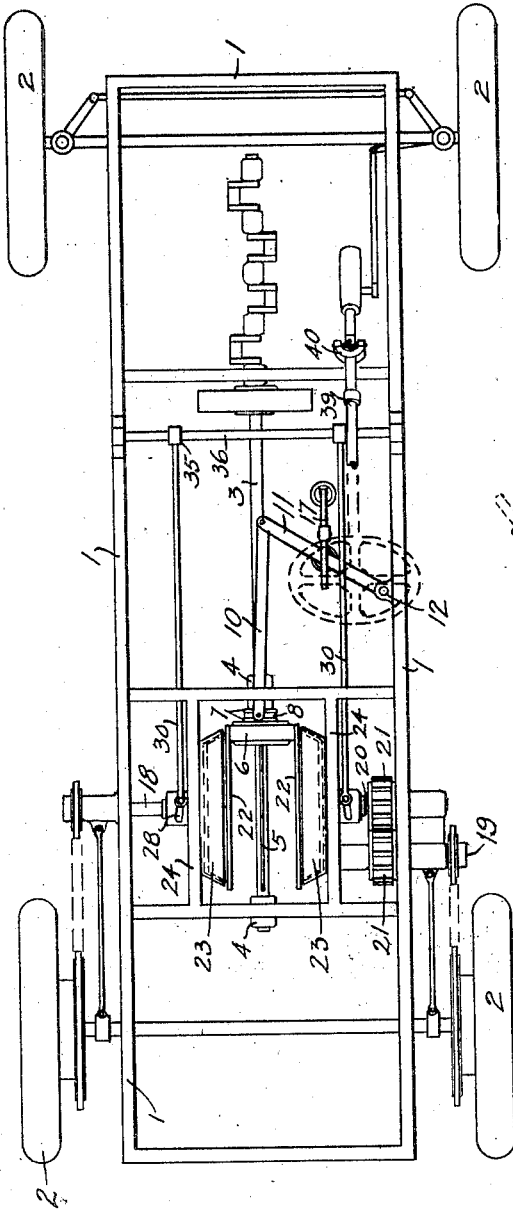

C. W. WILLETTE.
CONTROLLING MECHANISM FOR POWER DRIVEN VEHICLES.
APPLICATION FILED DEC. 27, 1907.

901,508.

Patented Oct. 20, 1908.
2 SHEETS—SHEET 1.

Witnesses
Julian Clough.
J. T. Craig

Inventor
Charles W. Willette
By R. J. Elliott
Attorney

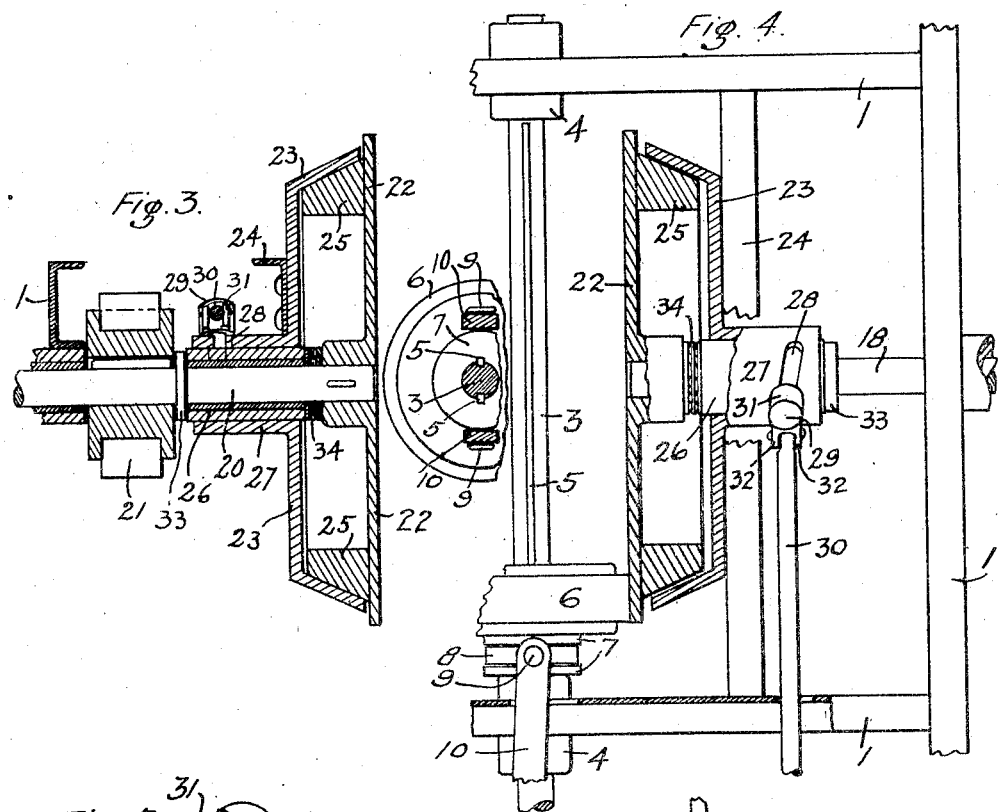

UNITED STATES PATENT OFFICE.

CHARLES W. WILLETTE, OF TACOMA, WASHINGTON, ASSIGNOR OF ONE-HALF TO JULIAN CLOUGH, OF TACOMA, WASHINGTON.

CONTROLLING MECHANISM FOR POWER-DRIVEN VEHICLES.

No. 901,508.

Specification of Letters Patent.

Patented Oct. 20, 1908.

Application filed December 27, 1907. Serial No. 408,239.

*To all whom it may concern:*

Be it known that I, CHARLES W. WILLETTE, a citizen of the United States of America, residing at Tacoma, in the county of Pierce and State of Washington, have invented certain new and useful Improvements in Controlling Mechanism for Power-Driven Vehicles, of which the following is a specification, reference being had therein to the accompanying drawing.

This invention relates to power driven vehicles and especially to the mechanism connecting the prime motor with the driven wheels of the vehicle and has for its objects to simplify the parts so that the first cost will be materially reduced; to increase the ease of controlling the vehicle; to give the vehicle great range of speed and of tractive power; to eliminate the necessity for a differential gear; and to reduce the number of controlling levers to be manipulated by the vehicle driver. I attain these objects by the devices, mechanisms and arrangements illustrated in the accompanying drawings, in which Figure 1 is a plan view of the chassis of an automobile equipped with my mechanism showing the parts in position for going slowly forward; Fig. 2 is a side elevation thereof with the parts in released or coasting position, the chassis being shown therein in broken lines; Fig. 3 is a vertical cross-section of the right-hand half of the mechanism, showing the friction transmission released and friction brake applied; Fig. 4 is a plan view (partly in section) of the left-hand half of the mechanism, showing the brake released and the transmission applied; Fig. 5 is a vertical cross-section of a part of the brake and transmission controlling mechanism; Fig. 6 is an elevation showing the connecting link between the hand-operated speed-changing lever and the horizontal swinging lever, the sockets of the parts being shown in section; Fig. 7 is a side elevation of the device for guiding and holding the pivoted steering post; and Fig. 8 is a plan thereof showing the post in the middle or coasting position.

Similar numerals of reference refer to similar parts throughout the several views.

My invention consists of an engine-driven shaft arranged longitudinally of the car and having a friction wheel slidably mounted thereon but rotating therewith, the position of this friction wheel on the shaft being controlled by a hand-operated speed-changing lever; the friction wheel is mounted centrally between two friction disks which are secured to transverse shafts which operate, by any convenient mechanism the driving wheels of the car; the rear or outer sides of the friction disks are equipped with friction brake cones; surrounding the brake cones, but normally not touching them, are the fixed braking cups, or female members, secured to the frame of the car; longitudinally movable bearings for the transverse shafts, with thrust bearings engaging the friction disks so that they are moved towards each other to engage the friction wheel, or away from each other to engage the braking cups; and a pivoted lever (preferably the steering post of the car) connected to and controlling the position of both said movable bearings so that they move equally, oppositely and simultaneously to control the friction disks.

Referring now to the drawings, the frame 1 of the car is mounted on four wheels 2, the rear pair being in this case the driving wheels. The engine is preferably mounted in front and has an engine shaft 3 mounted in suitable bearings 4 which are secured to the cross bars of the frame 1. The shaft 3 extends longitudinally towards the rear of the car and the rear portion of it is provided with suitable feathers or keys 5 engaging the friction wheel 6 and allowing it to slide longitudinally thereon but forcing it to turn therewith. A double collar 7 is secured to the friction wheel 6, and an annular body 8 is loosely mounted between the two parts of the double collar. The body 8 does not rotate with the wheel 6, and has two pins 9 which respectively fasten it to the upper and lower longitudinal links 10, which pass forward and are respectively pinned to the ends of the upper and lower arms 11 forming the horizontal swinging lever. These arms 11 are pivoted at the other ends to the fulcrum casting 12 secured to the frame 1. About midway between the ends of the arms 11 they are fastened together by the vertical pin 13. This pin is formed in two pieces, being fastened together at the middle by any suitable means, and having similar complementary hemispherical cavities at the junction of the two parts, and a hole leading thereinto. The ball 14 of the link 15 fits in the socket formed by the two cavities and the link 15 passes through the hole. The other end of the link 15 is provided with another ball 16 which fits in another socket formed similarly of two hemispherical cavities, one being on the end of the hand-operated speed-changing lever 17, and the other being secured thereto by any suitable means. The lever 17 is pivoted in any suitable position to the body of the car. It is obvious that when the lever 17 is moved it moves the friction wheel 6 on the shaft 3 through the action of the link 15, horizontal lever arms 11, links 10, annular body 8, and collars 7. It is also obvious that the friction wheel 6 rotates just as fast in one position as in any other position; in Figs. 1, 2 and 4 the position of this wheel is such as to drive the car forwards at slow speed.

The driving wheels 2 of the car are driven by means of sprocket gears and chains; on one side directly from the transverse shaft 18, and on the other side from an idle shaft 19 geared to the other transverse shaft 20 by the two equal gear wheels 21, so as to reverse the direction of rotation without changing the speed thereof. The two transverse shafts 18 and 20 are in alinement and can be moved transversely of the car in opposite directions by the hereinafter described mechanism. On the inner ends of these two shafts 18 and 20 are mounted the two friction disks 22 each adapted to engage the friction wheel 6 at opposite points thereon. It is obvious that the wheel 6 will rotate both of the disks 22 at the same speed but in opposite directions; that the nearer the wheel 6 is to the center of the disks 22 the faster they will be turned; and that if the wheel is on one side of the center of the disks it will turn them in the opposite direction to that which it would if it were on the other side thereof.

The braking of the car is accomplished by the friction between a pair of fixed female members or cups 23 secured to suitable bars 24 forming part of the frame 1, and correspondingly shaped friction cones 25 secured to the rear or outer sides of the friction disks 22. The parts are so arranged that when the disks 22 are in frictional engagement with the wheel 6, the cones 25 are out of engagement with the cups 23; and when the cones 25 are engaging the cups 23, the disks 22 are withdrawn from contact with the wheel 6. It is evident then that the control of the car (except as to its driven speed) lies in the shifting of the two disks 22 with their cones 25. The shifting of these two disks is accomplished by means of the bearings 26 of the shafts 18 and 20. These bearings 26 are cylindrical in form and are themselves mounted in the fixed outer bearings 27 formed on, or secured to the fixed braking cups 23. The two outer bearings 27 have spiral slots 28 made in their upper sides, the slots 28 extending about 30 degrees on each side of the vertical and being offset, in that distance, about one-half of an inch. Pins 29 are secured in the bearings 26 and pass through the slots 28. The two slots 28 are of equal but opposite pitch or inclination to the central axis of the car. The pins 29 are engaged by the rods 30 through any convenient universal joint, the one illustrated consisting of sleeves 31 on the pins 29 and held in place by the heads of the pins and each having two ears 32 between which the rod 30 is pinned. The bearings 26 are held from lateral movement relatively to the shafts 18 and 20 by the thrust shoulders on each end thereof, consisting of the collars 33 on the outer ends and the anti-friction thrust bearings 34 between the inner end of the bearings and the hubs of the friction disks 22. It is evident then that any angular movement given to the pins 29 results in angular and transverse movement of the bearings 26 and 34 and the collars 33, thus moving the disks 22 and the cones 25 transversely.

The rods 30 lead from the pins 29 to the levers 35 on the rocker shaft 36 and this shaft 36 is turned by the crank lever 37 and link 38 joining it to the steering post 39 which is provided with a universal joint 40 or pivot near its fixed lower end, so that by moving the post 39 down through a small angle the friction disks 22 are pressed against the revolving friction wheel 6 simultaneously and equally, thus eliminating any tendency to bend the driving shaft 3; or by moving it upwards through a small angle the friction brake cones 25 are brought into contact with the cups 23; while if it occupies an intermediate position the brakes and the friction gears are entirely released.

The steering post 39 is held between two plates 41 which are pressed together by the U-shaped springs 42 by which the plates 41 are fastened to the body of the car. These plates are shaped substantially as shown in Fig. 8 so that they will hold the post 39 in its central or coasting position or will, when it is moved therefrom, press it away from this central position, thus relieving the hands of the driver from the strain of holding the post in either the driving or braking positions.

It is evident that no differential gear between the two driving wheels 2 is needed as there is always a certain amount of slip between the wheels 6 and 22 and this slip will necessarily equalize between the two disks; and since the differential is used only on turning corners and since the friction gears will then generally be thrown out of engagement with the disks 22, the disks will be entirely independent of each other and no differential is needed.

Having described my invention, what I claim is:

1. In a power-driven vehicle, the combination of a rotating shaft, a movable bearing for the shaft; an outer fixed sleeve for said movable bearing, allowing a longitudinal motion thereof therein; a thrust shoulder on each side of said shaft bearing, whereby said shaft moves along its axis with the bearing; and means for moving said bearing along its axis.

2. In a power-driven vehicle, the combination of a rotating shaft; a movable bearing for the shaft; an outer fixed sleeve for said movable bearing, allowing a spiral motion thereof therein; a thrust shoulder on each side of said shaft bearing, whereby said shaft moves along its axis with the bearing; a spiral guide slot in said fixed sleeve; a pin in said movable bearing and extending through said spiral guide slot; and means engaging said pin to move it in said guide slot, whereby said bearing and shaft are moved along their axis.

3. In a power-driven vehicle, the combination of a post having a hand wheel mounted on the end thereof, and divided into two parts, and having its lower part fixedly positioned relatively to the vehicle; a universal joint connecting the two parts of the post, whereby the upper part is free to be moved out of the axis of the lower part; a guide on the vehicle and engaging the upper part of the post, to confine its movements to one plane; a prime motor mounted on the vehicle; a friction wheel driven thereby; a friction disk mounted at right angles to the friction wheel and adjacent thereto, and rotating proportionately with the speed of the vehicle, and being axially movable; a fixed brake mounted on the vehicle adjacent to the friction disk and on the opposite side thereof relatively to the friction wheel; and means connecting the upper part of the post to the friction disk and adapted to control the axial position of the friction disk between the friction wheel and the fixed brake by position of the upper part of the post.

4. In a power-driven vehicle, the combination with a prime-motor and shaft driven thereby; of a friction wheel mounted on said shaft; a pair of friction disks rotatively mounted on each side of said friction wheel, and being transversely movable relatively thereto and to each other, and each being rotatively connected to a driving wheel of the vehicle; a movable bearing for each of said friction disks; a thrust shoulder on each side of said bearings, whereby said disks are moved along their axis with their bearings; a post having a hand wheel mounted on the end thereof, and divided into two parts, and having its lower part fixedly positioned relatively to the vehicle; a universal joint connecting the two parts of the post, whereby the upper part is free to be moved out of the axis of the lower part; a guide on the vehicle and engaging the upper part of the post, to confine its movements to one plane; and means connecting said upper part to said movable disk bearings, whereby the position of the upper part controls the positions of the disks relatively to the friction wheel and to each other.

5. In a power-driven vehicle, the combination with a prime-motor and shaft driven thereby; of a friction wheel mounted on said shaft; a pair of friction disks rotatively mounted on each side of said friction wheel, and being transversely movable relatively thereto and to each other, and each being rotatively connected to a driving wheel of the vehicle; a movable bearing for each of said friction disks; an outer fixed sleeve for each of said movable bearings, allowing a spiral motion thereof therein; a thrust shoulder on each side of said movable bearings, whereby said disks are moved along their axis with the bearings; oppositely inclined spiral guide slots in said fixed sleeves; a pin in each of said movable bearings and extending through the spiral guide slot thereof; a post divided into two parts, and having its lower part fixedly positioned relatively to the vehicle; a universal joint connecting the two parts of the post, whereby the upper part is free to be moved out of the axis of the lower part; a guide on the vehicle and engaging the upper part of the post, to confine its movement to one plane; and means connecting said upper part to both of said pins, whereby the position of the upper part controls the positions of the pins, and of the bearings and disks relatively to the friction wheel and to each other.

6. In a power driven vehicle, the combination of a pair of friction brake wheels rotatively mounted on the vehicle, and being transversely movable thereon, and each being driven by a driving wheel of the vehicle; a pair of friction brake cups fixedly mounted on the vehicle adjacent to said rotating brake wheels, and adapted to be engaged thereby when said brake wheels are transversely moved into contact therewith; a movable bearing for each of said rotating friction brake wheels; a thrust shoulder on each side of said bearings, whereby said rotating friction brake wheels are moved along their axis with their bearings; a post having a hand wheel mounted on the end thereof and divided into two parts, and having its lower part fixedly positioned relatively to the vehicle; a universal joint connecting the two parts of the post, whereby the upper part is free to be moved out of the axis of the lower part; a guide on the vehicle and engaging the upper part of the post, to confine its movements to one plane; and means connecting said upper part to said movable bearings, whereby the position of the upper part controls the positions of the rotating friction brake wheels relatively to the fixed friction cups.

7. In a power-driven vehicle, the combination of a pair of disks rotatably mounted on the vehicle, and each rotatably connected to the driving wheels thereof, and each being transversely movable thereon, each of said disks having two friction surfaces on opposite sides thereof thereon; a rotated friction wheel mounted between said disks at right angles to the axis thereof and adjacent thereto; two friction cups fixedly mounted on said vehicle adjacent to the outer surfaces of said rotating disks; and means whereby said rotating disks may be moved transversely, either to throw the inner pair of friction surfaces thereon into engagement with said rotated friction wheel, or to throw the outer pair of friction surfaces thereon into engagement with said fixed friction cups.

In testimony whereof I affix my signature in presence of two witnesses.

CHARLES W. WILLETTE.

Witnesses:
 WM. P. HOPPING,
 D. McEDWARD.